United States Patent
Kjaer et al.

(10) Patent No.: US 9,306,473 B2
(45) Date of Patent: Apr. 5, 2016

(54) VARIABLE ROTOR SPEED WIND TURBINE, WIND PARK, METHOD OF TRANSMITTING ELECTRIC POWER AND METHOD OF SERVICING OR INSPECTING A VARIABLE ROTOR SPEED WIND TURBINE

(75) Inventors: Philip Richard Jacobsen Carne Kjaer, Arhus C (DK); Lars Helle, Suldrup (DK)

(73) Assignee: Vestas Wind Systems A/S, Aarhus N. (DK)

(*) Notice: Subject to any disclaimer, the term of this patent is extended or adjusted under 35 U.S.C. 154(b) by 1192 days.

(21) Appl. No.: 11/993,512

(22) PCT Filed: Jul. 1, 2005

(86) PCT No.: PCT/DK2005/000455
§ 371 (c)(1),
(2), (4) Date: Oct. 22, 2008

(87) PCT Pub. No.: WO2007/003183
PCT Pub. Date: Jan. 11, 2007

(65) Prior Publication Data
US 2009/0224607 A1      Sep. 10, 2009

(51) Int. Cl.
*F03D 9/00* (2006.01)
*H02P 7/08* (2006.01)
(Continued)

(52) U.S. Cl.
CPC .............. *H02M 7/493* (2013.01); *F03D 9/003* (2013.01); *H02J 3/38* (2013.01); *H02M 5/458* (2013.01); *Y02E 10/72* (2013.01); *Y02E 10/763* (2013.01); *Y10T 307/707* (2015.04)

(58) Field of Classification Search
CPC ........... F03D 9/003; H02J 3/38; H02M 5/458; H02M 7/493; Y02E 10/72; Y02E 10/763; Y10T 307/707
USPC ..................................................... 290/44, 55
See application file for complete search history.

(56) References Cited

U.S. PATENT DOCUMENTS 3,683,260 A * 8/1972 Alfon Fedorovich Kroger et al. ............................... 363/36
5,083,039 A * 1/1992 Richardson et al. ............ 290/44
(Continued)

FOREIGN PATENT DOCUMENTS

| CN | 1469825 A | 1/2004 |
| CN | 1575379 A | 2/2005 |

(Continued)

OTHER PUBLICATIONS

E. Cengelci and P. Enjeti, Modular PM generator/converLer topologies, suitable for utility interface of wind/micro turbine and flywheel type electromechanical energy conversion systems, Conference Record of the 2000 IEEE Industry Applications Conference, Oct. 8, 2000, pp. 2269-2276, vol. 4, IEEE.*

(Continued)

*Primary Examiner* — Tulsidas C Patel
*Assistant Examiner* — S. Mikailoff
(74) *Attorney, Agent, or Firm* — Patterson & Sheridan, LLP

(57) ABSTRACT

The invention relates to a variable rotor speed wind turbine transmitting AC electric power to a utility grid. The wind turbine includes at least one AC generator and at least two power electronic converter units. Further, it includes means for transforming at least one nominal output value of the generator to at least one different nominal input value of the at least two power electronic converter units. The invention also relates to a wind park and a method of transmitting AC electric power to a utility grid from a variable rotor speed wind turbine as well as a method of servicing or inspecting a variable rotor speed wind turbine.

31 Claims, 10 Drawing Sheets

(51) Int. Cl.
*H02M 7/493* (2007.01)
*H02J 3/38* (2006.01)
*H02M 5/458* (2006.01)

(56) References Cited

U.S. PATENT DOCUMENTS

| | | | |
|---|---|---|---|
| 6,249,443 B1* | 6/2001 | Zhou et al. ........................ | 363/5 |
| 6,676,122 B1* | 1/2004 | Wobben ........................... | 290/55 |
| 7,102,248 B2* | 9/2006 | Wobben ........................... | 290/44 |
| 7,199,485 B2* | 4/2007 | Wobben ........................... | 290/55 |
| 7,256,508 B2* | 8/2007 | Altemark et al. ................ | 290/44 |
| 7,414,331 B2* | 8/2008 | Datta .............................. | 307/71 |
| 7,819,019 B2* | 10/2010 | Bisgaard ................ | F03D 1/003 |
| | | | 73/856 |
| 2003/0168864 A1* | 9/2003 | Heronemus et al. ............ | 290/55 |
| 2004/0100102 A1* | 5/2004 | Wobben ........................... | 290/55 |
| 2004/0178639 A1* | 9/2004 | Wobben ........................... | 290/44 |
| 2005/0012339 A1* | 1/2005 | Mikhail et al. .................. | 290/44 |
| 2005/0225908 A1* | 10/2005 | Datta ............................. | 361/38 |
| 2006/0097519 A1* | 5/2006 | Steinke ........................... | 290/44 |
| 2006/0214428 A1* | 9/2006 | Altemark et al. ................ | 290/44 |
| 2006/0273595 A1* | 12/2006 | Avagliano et al. .............. | 290/44 |
| 2006/0274560 A1* | 12/2006 | Rastogi ................ | H02M 5/458 |
| | | | 363/131 |
| 2007/0273213 A1* | 11/2007 | Wang ........................ | H02J 3/04 |
| | | | 307/66 |
| 2009/0008945 A1* | 1/2009 | Helle ....................... | F03D 1/065 |
| | | | 290/55 |
| 2009/0073726 A1* | 3/2009 | Babcock ............... | H02M 7/497 |
| | | | 363/20 |
| 2009/0295225 A1* | 12/2009 | Asplund ............. | H02M 7/7575 |
| | | | 307/31 |
| 2010/0133901 A1* | 6/2010 | Zhang ................. | H02M 5/458 |
| | | | 307/11 |
| 2010/0292853 A1* | 11/2010 | McDonnell ............... | H02J 3/34 |
| | | | 700/287 |
| 2010/0327599 A1* | 12/2010 | Nielsen ................. | F03D 9/003 |
| | | | 290/55 |
| 2011/0140446 A1* | 6/2011 | Knoop .................. | E04H 12/085 |
| | | | 290/55 |
| 2011/0148198 A1* | 6/2011 | Tripathi .................. | H02J 3/386 |
| | | | 307/31 |
| 2011/0175355 A1* | 7/2011 | Rosenvard ............. | F03D 7/048 |
| | | | 290/44 |
| 2012/0007444 A1* | 1/2012 | Zapata ................... | H02H 7/222 |
| | | | 307/115 |
| 2012/0126628 A1* | 5/2012 | Bjerknes ............... | F03D 7/0224 |
| | | | 307/84 |
| 2012/0133142 A1* | 5/2012 | Langel .................... | F03D 1/001 |
| | | | 290/55 |
| 2012/0155125 A1* | 6/2012 | Zhang .................... | H02M 1/44 |
| | | | 363/34 |
| 2014/0092650 A1* | 4/2014 | Alston ..................... | H02J 3/36 |
| | | | 363/35 |
| 2014/0252775 A1* | 9/2014 | Hillerbrandt .......... | H01F 27/40 |
| | | | 290/55 |
| 2015/0159626 A1* | 6/2015 | Tarnowski ............. | F03D 7/028 |
| | | | 290/44 |

FOREIGN PATENT DOCUMENTS

| | | |
|---|---|---|
| DE | 100 44 262 | 3/2002 |
| DE | 10044262 A1 * | 3/2002 |
| WO | WO 00/73652 | 12/2000 |
| WO | 0232739 A1 | 4/2002 |
| WO | WO 03/015253 | 2/2003 |
| WO | 03036084 A1 | 5/2003 |
| WO | WO 03036084 A1 * | 5/2003 |
| WO | WO 2004114493 A2 * | 12/2004 |

OTHER PUBLICATIONS

International Search Report; PCT/DK2005/000455; Mar. 21, 2006.
E. Cengelci and P. Enjeti, Modular PM generator/converter topologies, suitable for utility interface of wind/micro turbine and flywheel type electromechanical energy conversion systems, Conference Record of the 2000 IEEE Industry Applications Conference, Oct. 8, 2000, pp. 2269-2276, vol. 4, IEEE.

* cited by examiner

VARIABLE ROTOR SPEED WIND TURBINE, WIND PARK, METHOD OF TRANSMITTING ELECTRIC POWER AND METHOD OF SERVICING OR INSPECTING A VARIABLE ROTOR SPEED WIND TURBINE

TECHNICAL FIELD OF THE INVENTION

The invention relates to a variable rotor speed wind turbine, a wind park and a method of transmitting electric power to a utility grid from a variable rotor speed wind turbine as well as a method of servicing or inspecting a variable rotor speed wind turbine.

BRIEF DESCRIPTION OF THE RELATED ART

A wind turbine known in the art typically comprises a wind turbine tower and a wind turbine nacelle positioned on top of the tower. A wind turbine rotor, comprising three wind turbine blades, is connected to an AC generator in the nacelle, as illustrated on FIG. 1. The AC generator is usually connected to an AC utility grid through a utility step up transformer.

However, the AC generator may also be part of a variable rotor speed wind turbine and consequently be connected to the utility grid through a power electronic converter.

Wind turbines have over the last decade evolved from small and simple power generating units with almost no impact on the utility grid to advanced miniature power plants with substantial penetration into the utility grids. As a consequence, the requirements to the performance and characteristics of the wind turbine and especially the power components are getting more and more significant and restrictive.

Most of the power components of a previous generation wind turbine have to be redesigned in order to cope with higher AC power ratings which results in an increasing development time for each next generation wind turbines.

From JP-A 2003-88190 it is known a variable rotor speed wind turbine with an AC generator connected to a utility grid through a power electronic converter. The Japanese document suggests to use a transformer in conjunction with the power electronic converter to dynamically raise the generated voltage output of the generator when the wind speed drops below a limit which normally indicates that the wind turbine must be disconnected from a utility grid because of low generator voltage i.e. the ratio of the transformer is subsequently changed away from unity.

Further, it is known to use conversion from the initially described type of wind turbine's AC power into high voltage DC. DC power transmission provides certain advantages over long distances e.g. a subsea cable from an offshore wind farm to the shore.

BRIEF SUMMARY OF THE INVENTION

The invention establishes technology which meets the requirements to modern wind turbines and especially the power components of the wind turbines establishing an electric AC power to be transmitted into a utility grid.

The invention further establishes technology which allows the power components to be chosen more freely and especially with more freedom from the common restrictions between the power components.

The invention additionally establishes a wind turbine system which in some aspect may be inspected and maintained while still being in operation.

The invention provides for a variable rotor speed wind turbine transmitting electric power to an AC utility grid wherein said wind turbine further comprises at least one nominal output value transformer for transforming at least one nominal output value of said generator to at least one different nominal input value of said at least one power electronic converter unit.

Hereby it is possible to establish technology which meets the requirements to especially the power components of the wind turbines establishing an electric AC power to be transmitted into a utility grid. The transformation allows the power components to be chosen more freely and the common restrictions between the components may largely be avoided.

Further, power components such as the generator and power electronic converter may be chosen optimally in individual ratings and locations. The higher freedom in ratings and locations allows a more reliable, maintainable and serviceable wind turbine to be established.

The term "nominal value" should be understood as the rating and/or number of the power component as given by the manufacturer.

The term "power component" should be understood as any electric component associated with power generation in the wind turbine e.g. the AC generator, the power electronic converter units, switchgear and any transformer.

In an aspect of the invention, said AC generator is a high voltage polyphase synchronous or asynchronous AC generator e.g. an AC generator with M times three phases. The high voltage output from the AC generator reduces the losses in the cable connection of the generator to the nominal output value transformer.

The use of a synchronous AC generator establishes an efficient power generation system, and the use of an asynchronous or induction AC generator establishes a simpler and more robust power generation system.

In aspects of the invention, said AC generator is a synchronous generator magnetised electrically or by permanent magnets. Hereby, it is possible to establish an efficient (i.e., economical) and reliable power generation system e.g. in connection with a passive rectifier in the generator side of the power electronic converter unit.

In an aspect of the invention, said AC generator is a low-speed, high pole-number synchronous generator. Hereby, it is possible to avoid a gear in the wind turbine i.e. minimizing the number of mechanical components in the wind turbine.

In an aspect of the invention, said AC generator is connected to said at least one power electronic converter unit through said nominal output value transformer. An advantageous embodiment of the invention is achieved hereby.

In an aspect of the invention, said at least one power electronic converter unit include more than one unit. Hereby it is possible to create a modular and redundant parallel construction wherein one failed unit may be replaced as a form of N–1 operation without disconnecting or stopping the wind turbine. Further, inspection and maintenance of a unit may also be performed while the other units continue their normal functionality. Consequently, a wind turbine with a high availability may be established as the power electronic converter is a less critical component.

In an aspect of the invention, said more than one power electronic converter unit all have the same nominal values and/or are of the same type. Hereby, it is possible to enhance the serviceability of the wind turbine and especially diminish the storage number of necessary spare parts.

In an aspect of the invention, said nominal output value transformer comprises a fixed transformation ratio. An advantageous embodiment of the invention is achieved hereby.

In an aspect of the invention, said nominal output value transformer transforms the nominal generator voltage rating and/or number of phases. Hereby it is possible to use the different power components at their optimal values without restrictions.

In an aspect of the invention, said nominal output value transformer transforms a nominal voltage output value of the AC generator to a different nominal voltage input value of said at least one power electronic converter unit. Hereby it is possible to use the different power components at their optimal voltage values without restrictions including in the acceptable distances between the components.

In an aspect of the invention, said nominal output value transformer transforms a high voltage to a lower voltage e.g. from a value ranging beyond 3300 Volts AC to a value less than 3300 Volts AC of a power electronic converter unit such as a higher voltage between 3300 and 15000 Volts of the AC generator and a lower voltage between 690 and 3300 Volts per power electronic converter unit.

In a further aspect of the invention, said high voltage is chosen between the values of: 3300, 4160, 6600, 10000, 11000 and 13200 Volts, and said lower voltage is chosen between values of 690, 1000, 2200 and 3300 Volts per power electronic converter unit.

The high voltage of the AC generator and the lower voltage per power electronic converter unit are advantageously matched such as 3300/690 and 13200/3300 (AC generator voltage/voltage of the power electronic converter unit). The matched values are preferably the lowest AC generator voltages to the lowest voltage of the power electronic converter unit and vice versa. However, any relevant combinations of the mentioned AC generator voltage/voltage of the power electronic converter unit values are possible.

The lower voltage level in the power electronic converter enables the converter designer to overcome the limits of present power semiconductor technology. The designer is especially allowed to use power semiconductors with lower nominal voltage ratings instead of high voltage power semiconductors which are priced significantly higher. The serviceability of the power electronic converter units are also enhanced as the safety requirements are less rigorous at lower voltage levels.

In an aspect of the invention, said nominal output value transformer transforms a number of phases of the AC generator to a different number of phases of said at least one power electronic converter unit. The converter designer is allowed to reduce the content of harmonics in the power delivered to the AC generator by the different number of phases. The harmonics may be reduced or cancelled by a carefully selected angular displacement between the transformer phase windings.

In an aspect of the invention, said at least one power electronic converter unit is at least one AC-DC-AC converter. An advantageous embodiment of the invention is achieved hereby.

In aspects of the invention, said at least one power electronic converter unit is connected to the utility grid through at least one utility grid transformer and said at least one utility grid transformer transforms the output voltage and/or number of phases of said at least one converter unit to the utility grid.

The transformation allows the components of the power electronic converter units to be chosen more freely and the wind turbine may thus be connected to a utility grid of a given high voltage value without restrictions.

The number of utility grid transformer phases may be used to reduce the amount of harmonics in the power delivered to the utility grid by a carefully selected angular displacement between the phases.

In an aspect of the invention, said nominal output value transformer transforms three phases of the AC generator to a three phases of the utility grid through at least two parallel three-phase power electronic converter units such as three three-phase power electronic converter units. Paralleling of a plurality of power electronic converter units makes the power electronic converter highly redundant and allows service during operation at reduced power in case one power electronic converter unit should fail.

In an aspect of the invention, said nominal output value transformer transforms M times three phases of the AC generator to three phases of the utility grid through at least two parallel three phase power electronic converter units, such as a nine-phase AC generator to three three-phase power electronic converter units. Hereby it is possible with the number of phases to reduce or avoid harmonics in the generator and consequently achieve a higher torque density in the generator.

The phrase "parallel . . . power electronic converter units" is to be understood as power electronic converter units connected directly in parallel or connected in parallel through winding connections of one or more transformers.

In aspects of the invention, the connection between the AC generator and said nominal output value transformer comprises a minimum cable or busbar distance enabling the connection to extend out of the nacelle and at least said at least one power electronic converter unit is positioned outside the nacelle. The location of the power electronic converter unit outside the nacelle, gives a substantial reduction in weight and size of the nacelle and thus a reduction in the costs of assembly. Removing the power electronic converter from the nacelle allows the manufacturer to produce the wind turbine itself independent of local grid conditions as the layout of the nacelle is unaffected by changes in the electrical system.

In an aspect of the invention, at least said at least one power electronic converter unit is positioned in the tower of the wind turbine e.g. at a lower part of the tower such as at or in proximity of the tower foundation. The width of the tower at the foundation allows easy installation of the power electronic converter units.

In an aspect of the invention, at least said at least one power electronic converter unit is located outside the nacelle and tower of the wind turbine. Hereby, it is possible to locate the power electronic converter units in a separate place on the ground with an optimized environment for the units e.g. a place with more space and better climate control. Further, the ground location may reduce the price of the transformer and the power electronic converter units because these power components do not need the same mechanical stability as if they were placed in the nacelle.

The separate place also enhances the serviceability of the wind turbine by being easier to access by service personnel.

Note that other places outside the nacelle may be chosen for the relevant power components beyond the abovementioned places. The power components may for example be positioned or suspended on the outside surface of the nacelle or on the tower surface above ground level.

In an aspect of the invention, the organization and location of the power electronic converter units enables redundancy in said wind turbine by N−1 operation. The established wind turbine is thus more reliable, maintainable and serviceable as the N−1 converter units may continue to transfer power while the last unit is being inspected, maintained or replaced if it has malfunctioned. It is noted that N−1 operation denotes a system configuration wherein when a system having N components has one component that fails (i.e., with N−1 components still operational), the system is still capable of maintaining proper operation. Thus, as shown in FIGS. 6 and 9, even after the loss of one power electronic converter unit, the wind turbine can still provide electricity to the grid using the remaining N−1 power electronic converter units.

In an aspect of the invention, each of said at least one power electronic converter unit includes switchgear such as first switchgear in the connection before each unit and second switchgear in the connection after each unit. Hereby it is possible to inspect, maintain or replace the unit if it has malfunctioned while any remaining units may continue to transfer power. The nominal output value transformer and utility grid transformer may allow the use of lower voltage switchgear in relation to the AC generator and the utility grid. Consequently, inspection, maintenance or replacement of the power electronic converter units may be performed by workers under less rigorous precautionary measure.

In an aspect of the invention, at least one nominal output value transformer, at least one power electronic converter unit and at least one utility grid transformer form a power module. Each power module may be manufactured and delivered to the site of the wind turbine in one single container custom made to fit the local utility grid conditions.

In a further aspect of the invention, the number (N) of power electronic converter units is between 2 and 10 parallel units. Hereby, it is possible to establish redundancy in said wind turbine by N−1 operation as well as control of transmitted power per power electronic converter unit.

The invention also relates to a wind park such as an offshore wind park, said park comprising at least two variable rotor speed wind turbines, and in an aspect, power electronic converter units of different wind turbines are located in a common housing. The central housing of power electronic converter units further enhances the serviceability of the wind turbine by being easy to access by service personnel.

The invention also relates to a method of transmitting electric power to an AC utility grid from a variable rotor speed wind turbine, said method comprising the steps of: generating AC power with at least one AC generator, transforming at least one nominal value of said AC generator to at least one different nominal input value of at least one power electronic converter unit with at least one nominal output value transformer, and converting the power to said AC utility grid with said at least one power electronic converter unit.

In aspects of the invention, at least one of said at least one power electronic converter unit is connected or disconnected with switchgear, and the transmitted power per unit of the remaining power electronic converter units is controlled e.g. controlled to a value close to a nominal power rating of said unit. Hereby it is possible to inspect or service a disconnected unit and maintain transmission of power from the remaining power electronic converter units e.g. by units controlled to a value close to a nominal power rating of the units.

The invention also relates to a of servicing or inspecting a variable rotor speed wind turbine transmitting electric AC power to a utility grid, said method comprising the steps of: transforming at least one nominal value of said AC generator to at least one different nominal input value of at least two power electronic converter units with at least one nominal output value transformer, transforming at least one nominal value of said at least two power electronic converter units with at least one utility grid transformer, disconnecting one converter unit under servicing or inspection of said unit from the nominal output value and utility grid transformers with switchgear, and operating the remaining units of the wind turbine in N−1 operation. An advantageous embodiment of the invention is obtained hereby in relation to servicing or inspecting a variable rotor speed wind turbine.

BRIEF DESCRIPTION OF THE FIGURES

The invention will be described in the following with reference to the figures in which.

DETAILED DESCRIPTION OF THE INVENTION

Figure 1:
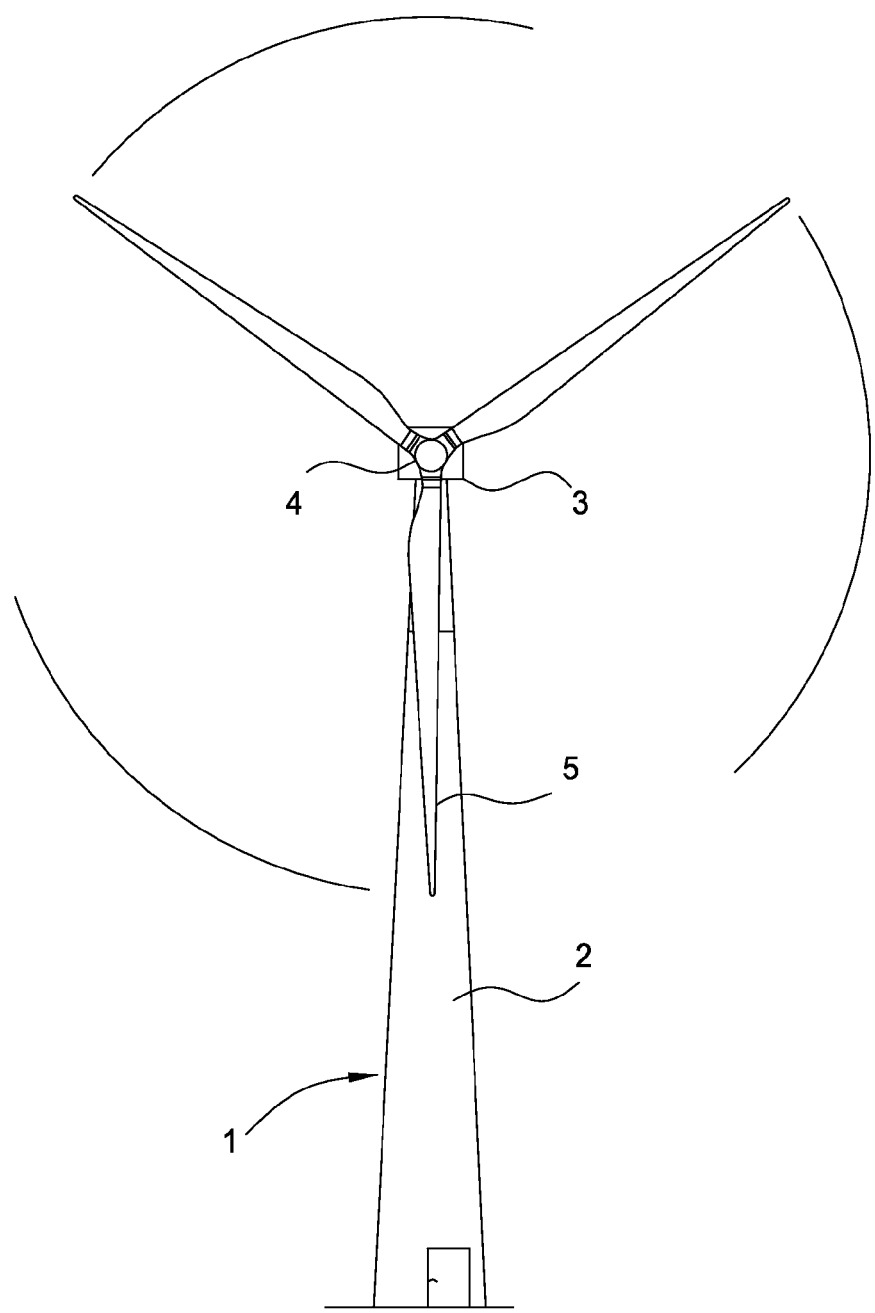
FIG. 1 illustrates a large modern wind turbine.

FIG. 1 illustrates a modern variable rotor speed wind turbine 1 with a tower 2 and a wind turbine nacelle 3 positioned on top of the tower. The wind turbine rotor 4, comprising three wind turbine blades 5, is connected to at least one AC generator located in the nacelle 3 through a shaft that extends out of the nacelle front.

As illustrated in the figure, wind beyond a certain level will activate the wind turbine rotor due to the lift induced on the blades and allow it to rotate in a perpendicular direction to the wind.

The rotation movement is converted to electric power in the AC generator. From the AC generator in the nacelle 3 the electric power is fed trough a power electronic converter and transmitted to a utility grid. The wind turbine may be a full scale or double fed converter type of wind turbine with or without a gear.

The power generation in the wind turbine may be performed with more than one AC generator such as between two and four AC generators.

Figure 2:
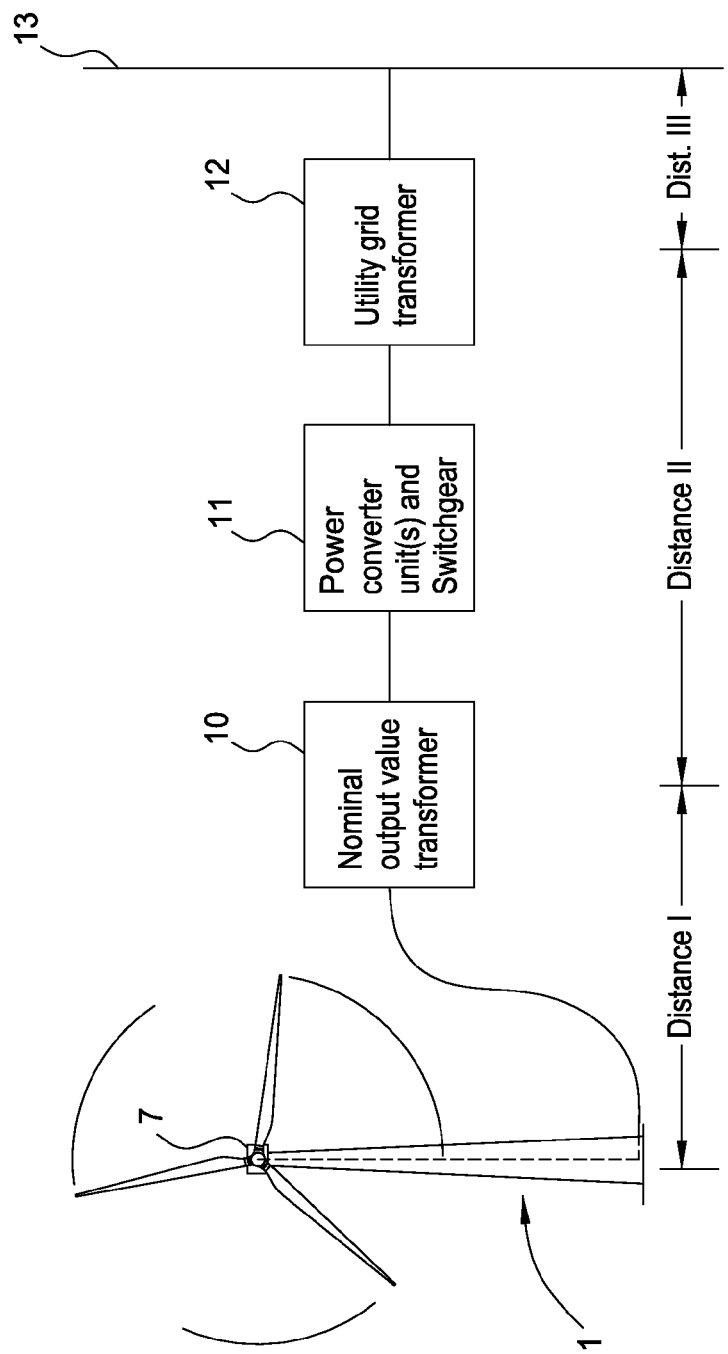
FIG. 2 illustrates the AC generator of the wind turbine connected to power components placed outside the nacelle according to the invention.

FIG. 2 illustrates the invention wherein the AC generator 7 of the wind turbine 1 is connected to a number of further power components. The power components include a nominal output value transformer 10 and at least one power electronic converter unit 11 including switchgear. The transformer 10 may for example transform a nominal voltage or number of phases of the AC generator 7 to a different nominal voltage or number of phases of the power electronic converter unit or units 11.

The figure also illustrates that the power electronic converter unit is connected to the utility grid 13 through a utility grid transformer 12. The utility grid transformer may for example transform a nominal voltage or number of phases of the power electronic converter unit to a different nominal voltage or number of phases of the utility grid.

The figure further illustrates three distances in between the wind turbine 1 and the utility grid 13.

The first distance, distance I, is the distance between the AC generator of the nacelle 3 and the primary windings of the nominal output value transformer 10. The first distance is a minimum cable or busbar distance which at least extends out of the nacelle 3.

The second distance, distance II, is the distance between the secondary windings of the nominal output value transformer 10 and the primary windings of the utility grid transformer 12.

The third distance, distance III, is the distance between the secondary windings of the utility grid transformer 12 and the utility grid 13.

The second distance is usually the shorter distance as the voltage rating of the distance is lower than the first distance and/or the third distance.

Figure 3:
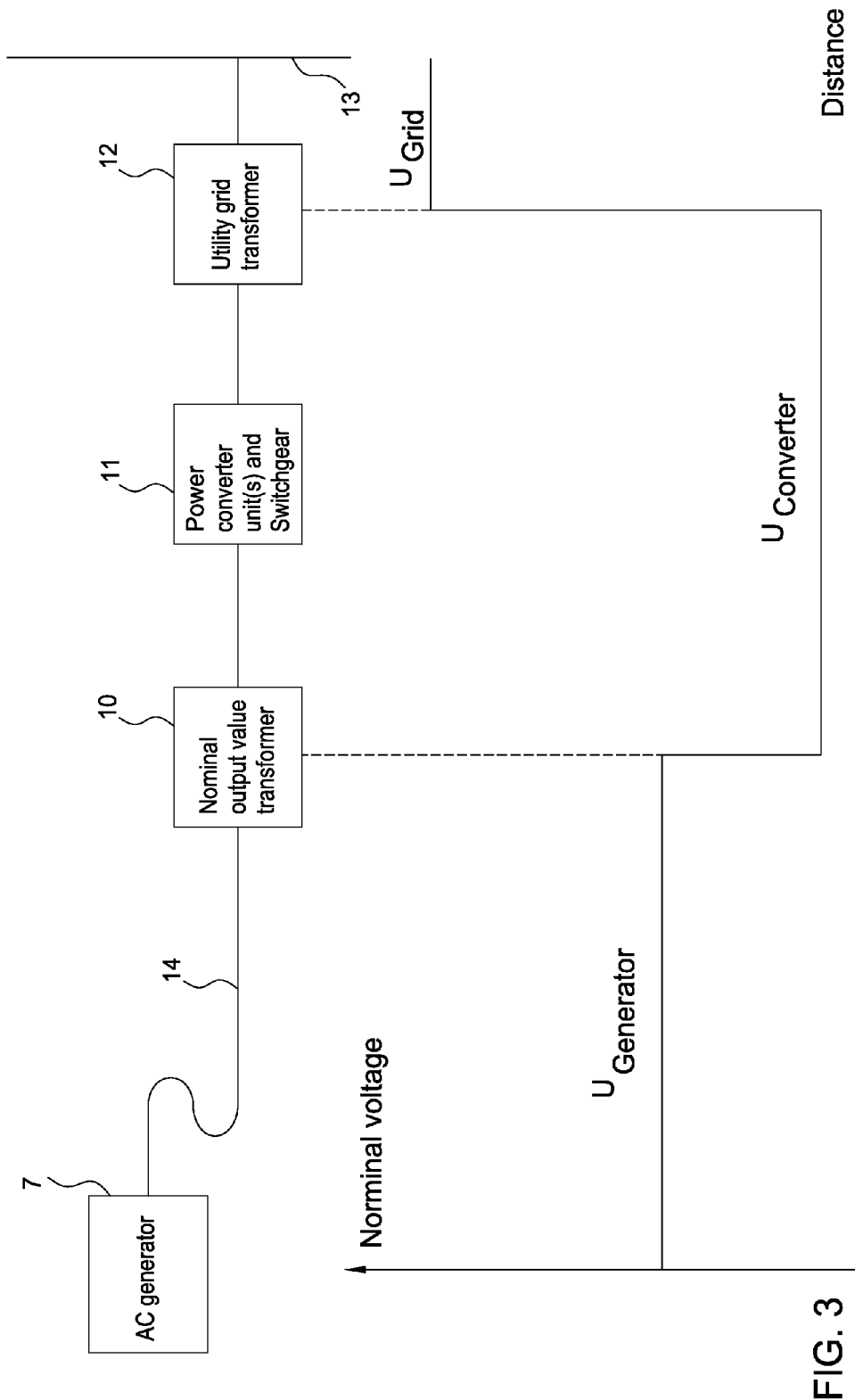
FIG. 3 illustrates the wind turbine of the invention with an accompanying curve showing the nominal voltage transformation.

FIG. 3 illustrates the wind turbine 1 with an accompanying curve showing the nominal voltage transformation over the distance of the wind turbine power components. The curve illustrates the changing nominal voltage levels of the power components from the AC generator 7 to connection point of the wind turbine on the utility grid 13. Reference characters $U_{generator}$, $U_{converter}$, and $U_{grid}$ denote the nominal voltage over the distances described in the figure. $U_{generator}$ refers to the nominal voltage along the distance between the AC generator 7 and the nominal output transformer 10. Next, $U_{converter}$ refers to the nominal voltage between the nominal output transformer 10 and the utility grid transformer 12. Finally, $U_{grid}$ refers to the nominal voltage between utility grid transformer 12 and the utility grid 13.

The nominal voltage value of the AC generator 7 may be in the range of 3300 to 15000 Volts AC e.g. 3300, 4160, 6600, 10000, 11000 or 13200 Volts in a preferred embodiment.

The nominal voltage value of the power electronic converter units may be less than 3300 Volts AC e.g. in a range of approximately 690 to 3300 Volts AC in a preferred embodiment such as 690, 1000, 2200 or 3300 Volts per power electronic converter unit.

The nominal voltage value of the utility grid may be in the range from 10 to 36 kV AC such as 10 kV, 11 kV, 20 kV, 22 kV, 24 kV, 30 kV, 33 kV or 36 kV AC at a utility grid frequency of 50 or 60 Hz.

Consequently, the curve initially shows the AC generator voltage, a voltage step down at the converter unit to a final voltage step up at the wind turbine connection to the utility grid.

Figure 4:
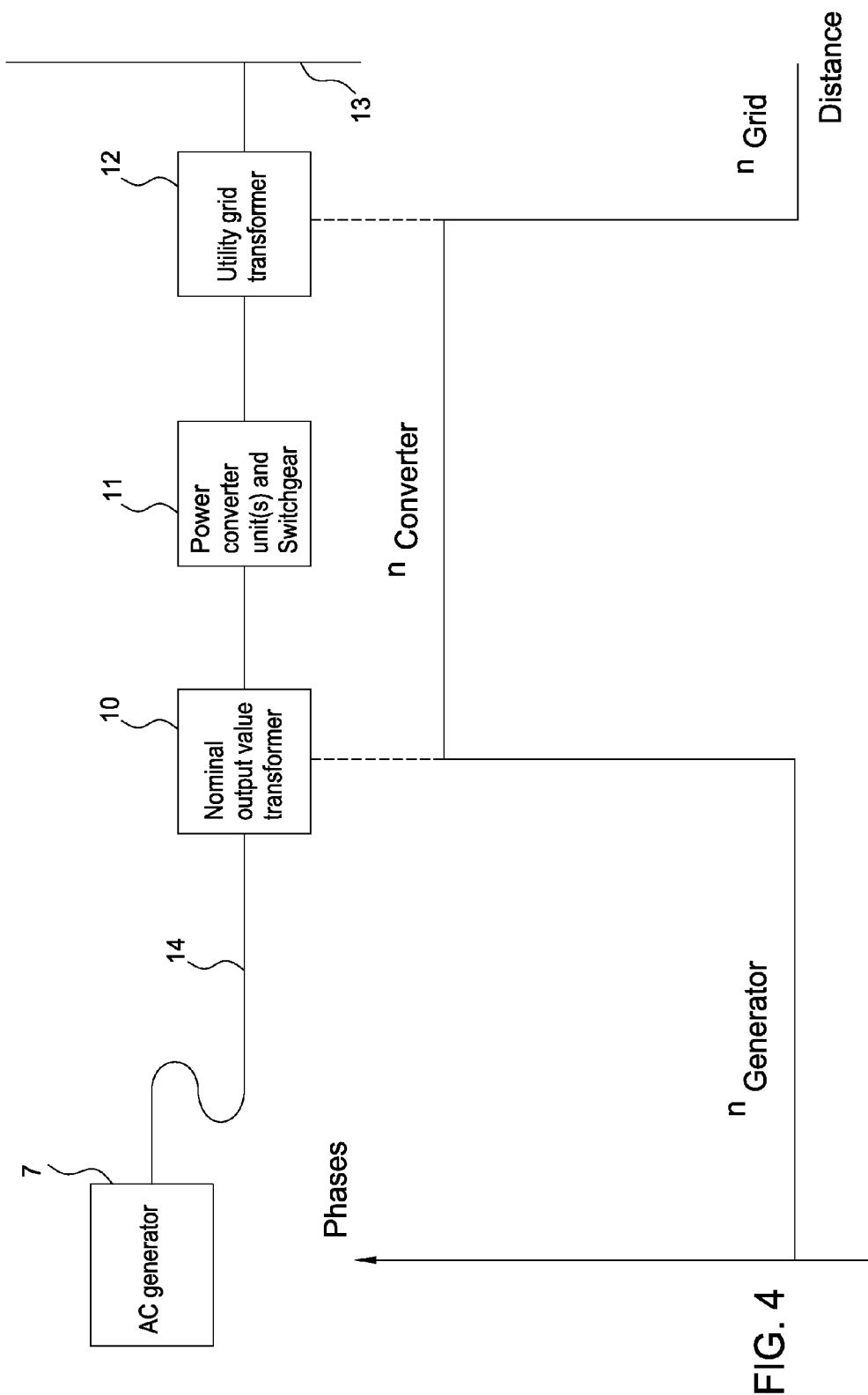
FIG. 4 illustrates the wind turbine of the invention with an accompanying curve showing the number of phase transformation.

FIG. 4 illustrates the wind turbine 1 with an accompanying curve showing the number of phases transformation over the distance of the wind turbine. The curve illustrates the changing number of phases of the power components from the AC generator 7 to the utility grid 13.

The phase number of the AC generator 7 is at least three e.g. three or nine phases in a preferred embodiment.

The phase number of the power electronic converter units is three phases per unit in a preferred embodiment.

The phase number of the utility grid is usually three phases, but could be two times three phases.

Figure 5:
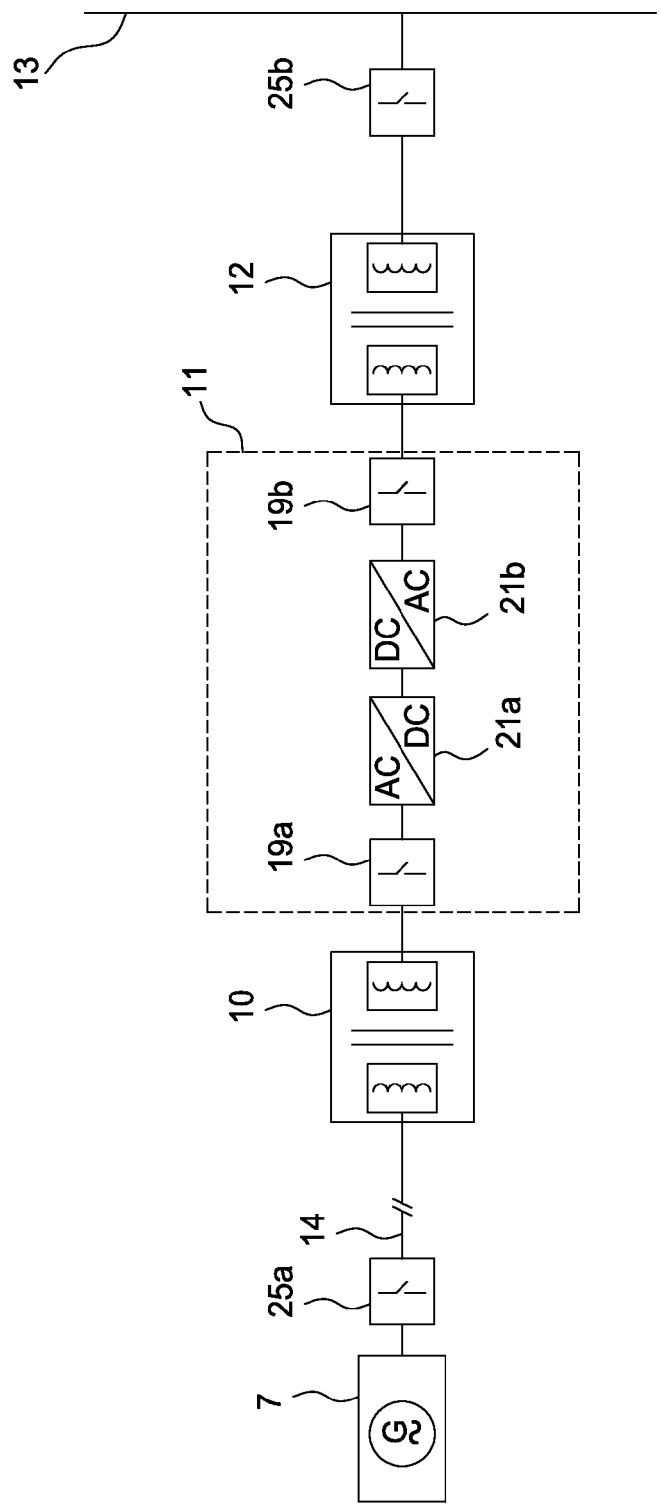
FIG. 5 illustrates schematically the utility grid connection of the wind turbine according to the invention.

FIG. 5 illustrates schematically the utility grid connection of the wind turbine according to the invention.

The power components are illustrated with the AC generator 7 of the wind turbine being connected to the nominal output value transformer 10 and a power electronic converter unit 11. The power electronic converter unit 11 is connected to the utility grid 13 through the utility grid transformer 12.

The figure further illustrates high voltage switchgear 25a, 25b at the AC generator 7 and the utility grid 13 e.g. to enable disconnection of the AC generator or the utility grid.

Figure 6:
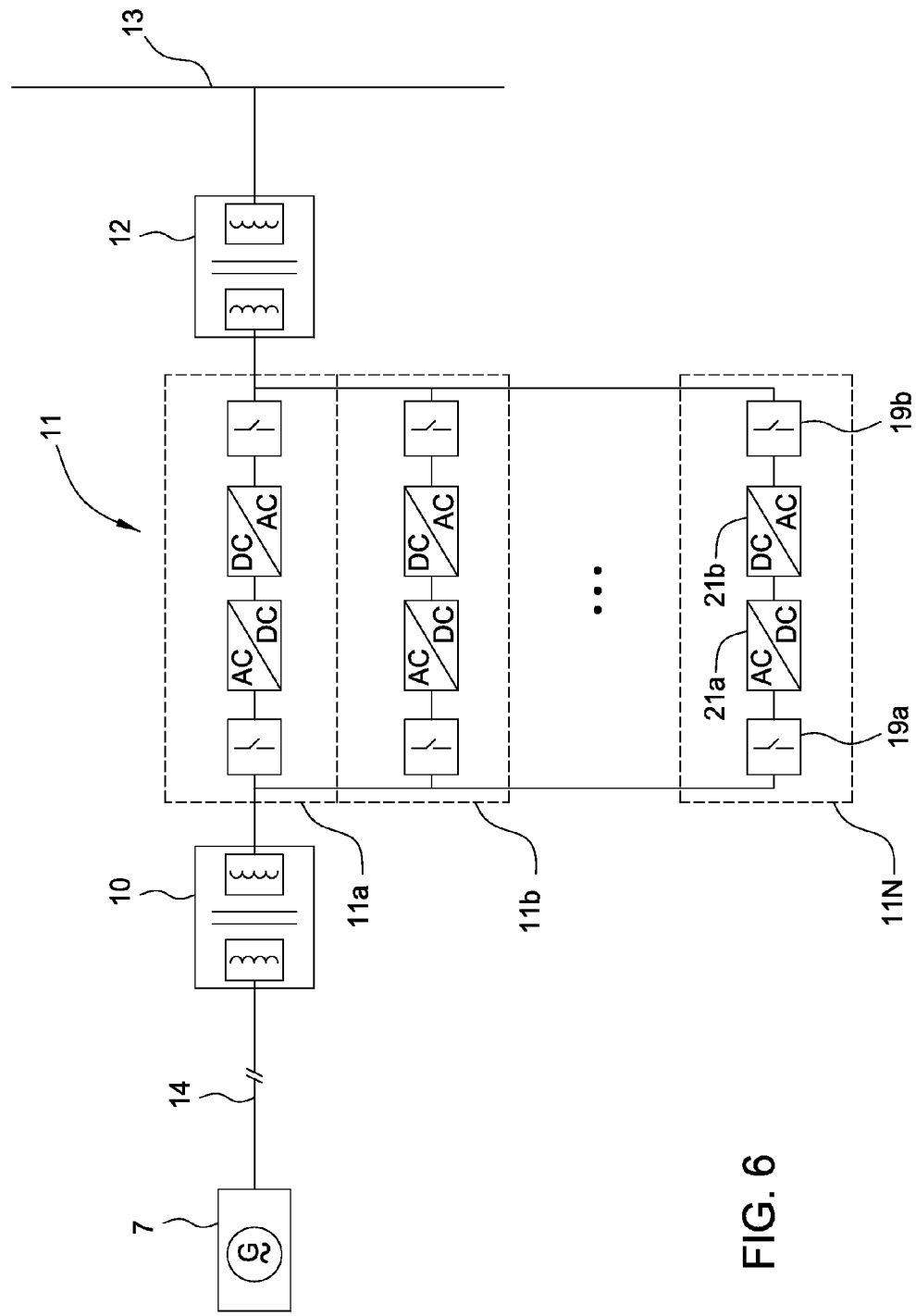
FIG. 6 illustrates schematically a first preferred embodiment of the wind turbine including a plurality of power electronic converter units.

FIG. 6 illustrates schematically a first preferred embodiment of the wind turbine including a plurality of power electronic converter units 11.

The power electronic converter unit 11 is illustrated as a plurality of parallel power electronic converter units (11a, 11b, . . . , 11N) i.e. at least two units. Each unit is further illustrated as comprising switchgear.

The number of power electronic converter units 11a, 11b, . . . , 11N is schematically illustrated as two parallel units each including switchgear 19a, 19b and common connections to the nominal output value transformer 10 and utility grid transformer 12, respectively. The first switchgear 19a of a unit is located in the connection to the nominal output value transformer 10 and may connect or disconnect the unit from the transformer 10. The second switchgear 19b is located in the connection from the unit to the utility grid transformer 12 and may connect or disconnect the unit from the transformer 12. The switchgear 19a, 19b allow each power electronic converter unit 11a, 11b, . . . , 11N to be electrically connected to or disconnected from the other power components and thus establish or terminate the power transmission through the power electronic converter unit.

The transformers are connected to the AC generator 7 and the utility grid 13. The connection distance between the AC generator 7 and nominal output value transformer 10 is illustrated as significant e.g. at least beyond the nacelle limits.

Further parallel power electronic converter units may be used e.g. to enhance the redundancy of the converter system as well as to limit the power rating of each unit. The number of parallel converter units may for example be between 2 and 10 wherein the units together establishes the same power rating as one large converter.

Even further, the parallel converter units may be connected and disconnected in order to enhance the utilization of each unit in relation to the power rating of the unit.

Figure 7:
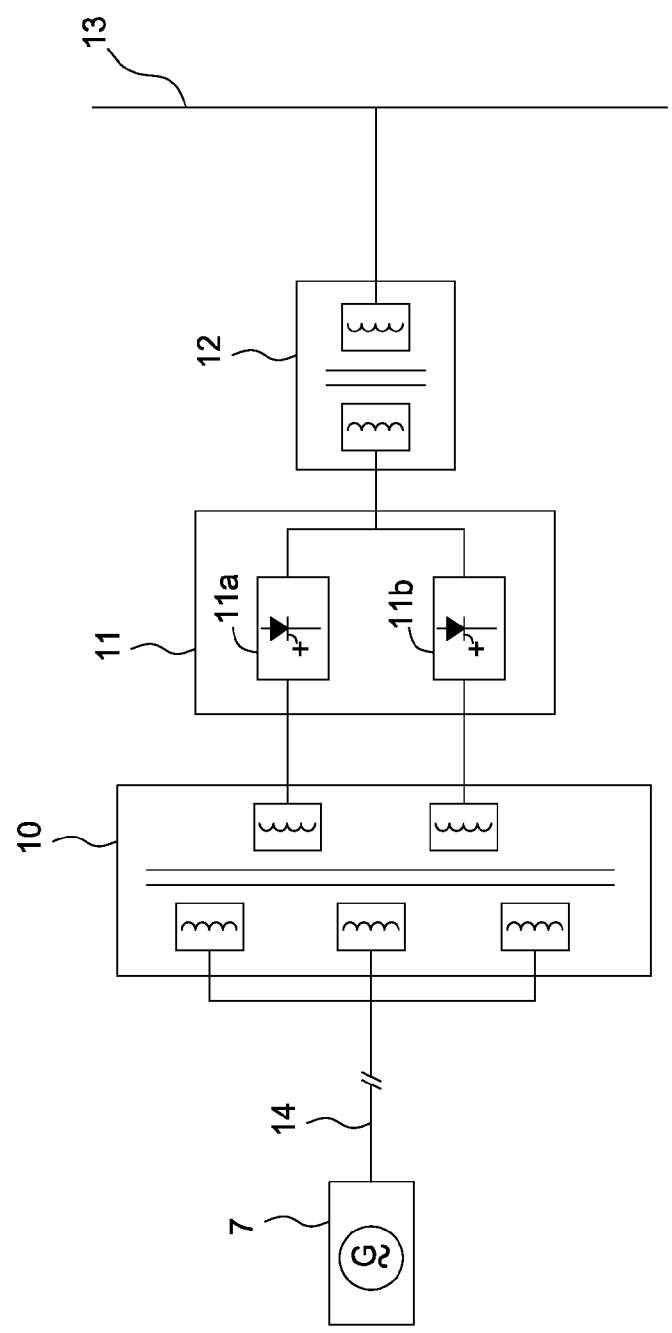
FIG. 7 illustrates schematically a second preferred embodiment of the wind turbine including a multi-phase nominal output value transformer.

FIG. 7 illustrates schematically a second preferred embodiment of the wind turbine including a multi-phase nominal output value transformer 10.

The number of primary windings of the transformer is schematically illustrated as three three-phase windings transforming the AC power to two three-phase secondary windings on the power electronic converter side. Each secondary winding is connected to a power electronic converter unit with independent connections. The two parallel units 11a, 11b have a common connection to the utility grid transformer 12 as illustrated in FIG. 6.

Different combinations and numbers of transformer windings may be used e.g. to reduce the harmonic content in power supplied to the utility grid.

Figure 8:
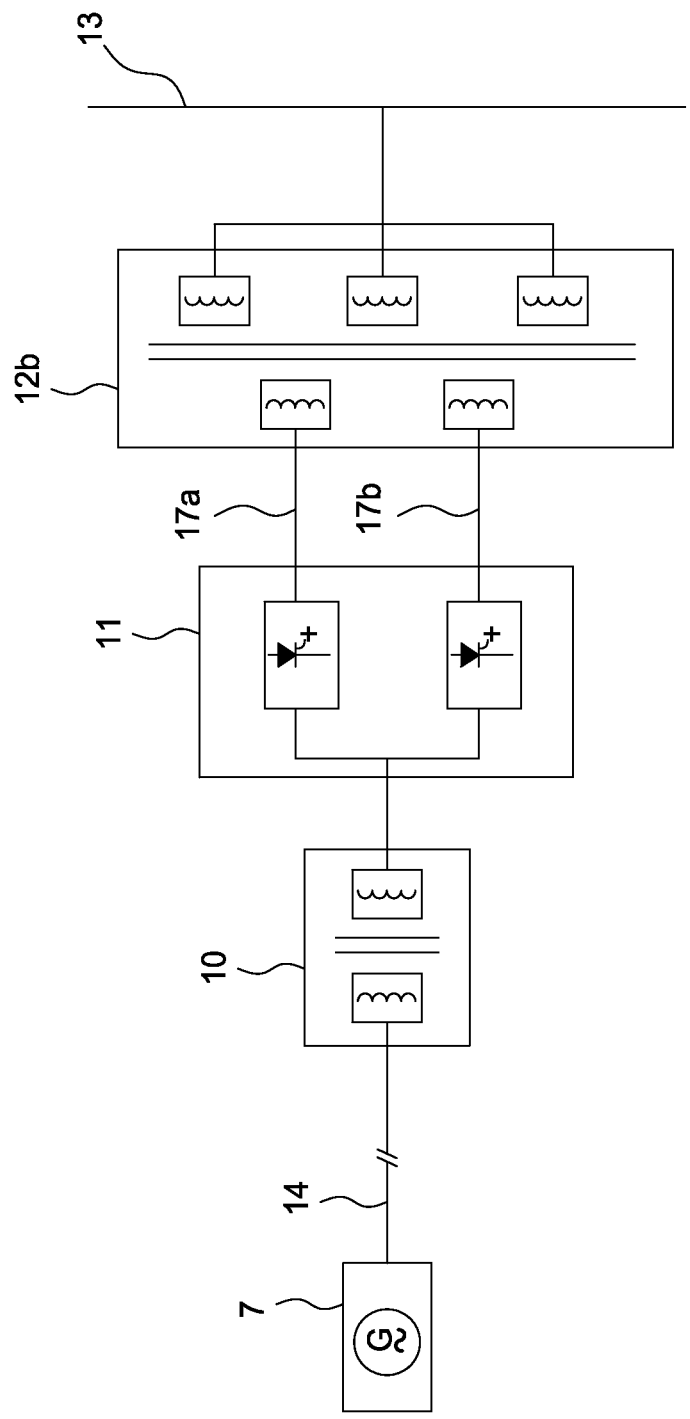
FIG. 8 illustrates schematically a third preferred embodiment of the wind turbine including a multi-phase utility grid transformer.

FIG. 8 illustrates schematically a third preferred embodiment of the wind turbine including a multi-phase utility grid transformer.

The number of primary windings of the transformer is schematically illustrated as two three-phase windings transforming the AC power to three three-phase secondary windings 12b. Each primary winding is connected to a power electronic converter unit 11 with independent connections 17a and 17b. Each secondary winding is connected to the utility grid 13 e.g. with a magnetic configuration to obtain angular displacement between phases.

As mentioned above, further parallel power electronic converter units may be used e.g. to enhance the redundancy of the converter system as well as to limit the power rating of each unit.

Figure 9:
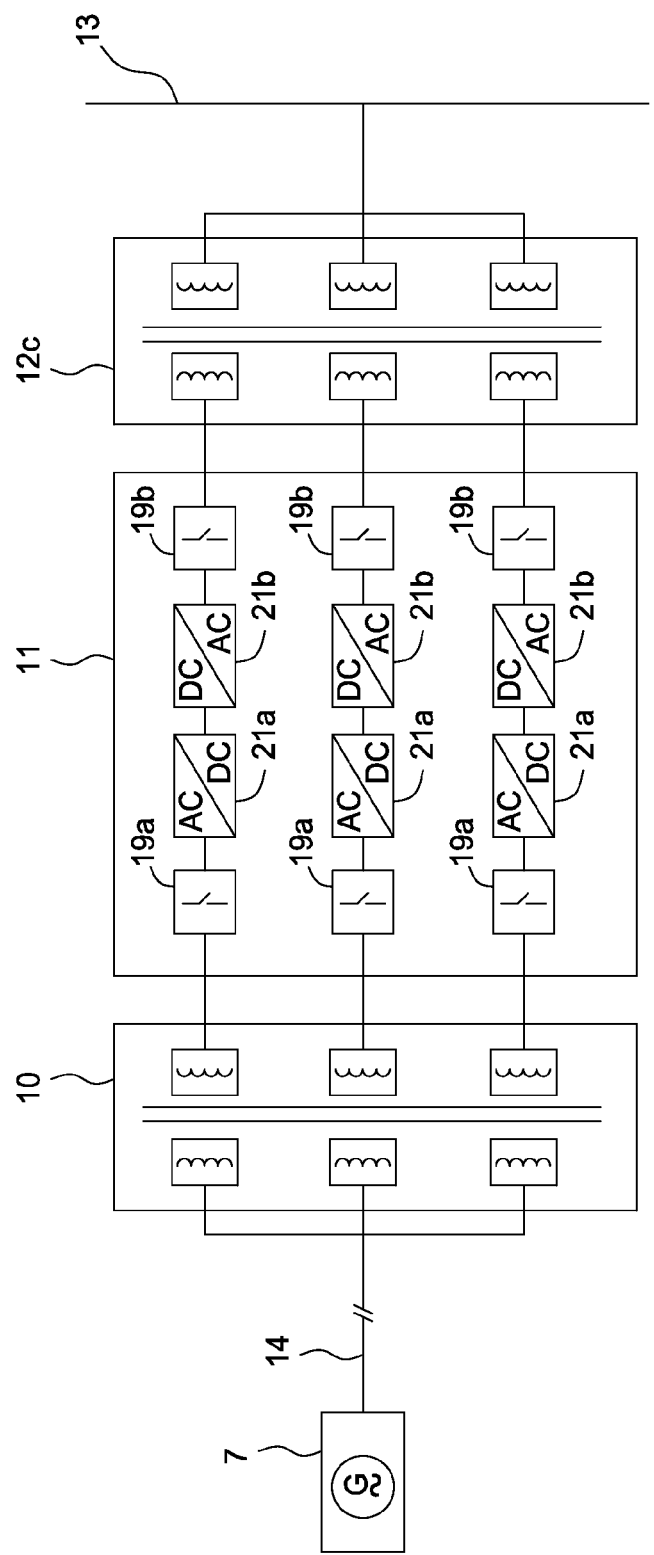
FIG. 9 illustrates in more details a preferred embodiment of the wind turbine according to the invention.

FIG. 9 illustrates in more details a preferred embodiment of the invention including the coupling of the AC generator 7, the first transformer 10, the power electronic converter units 11 and the utility grid transformer 12*c*.

The AC generator 7 may be an eight-pole, three times three-phase high voltage squirrel cage induction generator, but could also be another number or type of generator e.g. at least two induction generators.

The power electronic converter units 11 are three parallel AC/DC/AC three-phase power electronic converter units, to process the generated power, each power electronic converter unit having a generator side active rectifier 21*a*, a DC link and a utility grid side inverter 21*b*.

The nine phases from the AC generator is by means of the cable 14 connected to separate sets of windings on the primary side of the nominal output value transformer 10. The secondary side of the transformer 10 is connected to the generator side of the three parallel three-phase power electronic converter units 11.

The primary side of the transformer has nine phases obtained by a proper angular displacement of the primary winding sets.

On the secondary side of the transformer, three three-phase AC/DC/AC converter power units are used to process the generated power.

In another preferred embodiment the 9 phase AC generator is replaced by a 3 phase AC generator with corresponding number of phases on the primary side of the nominal output value transformer 10.

Figure 10:
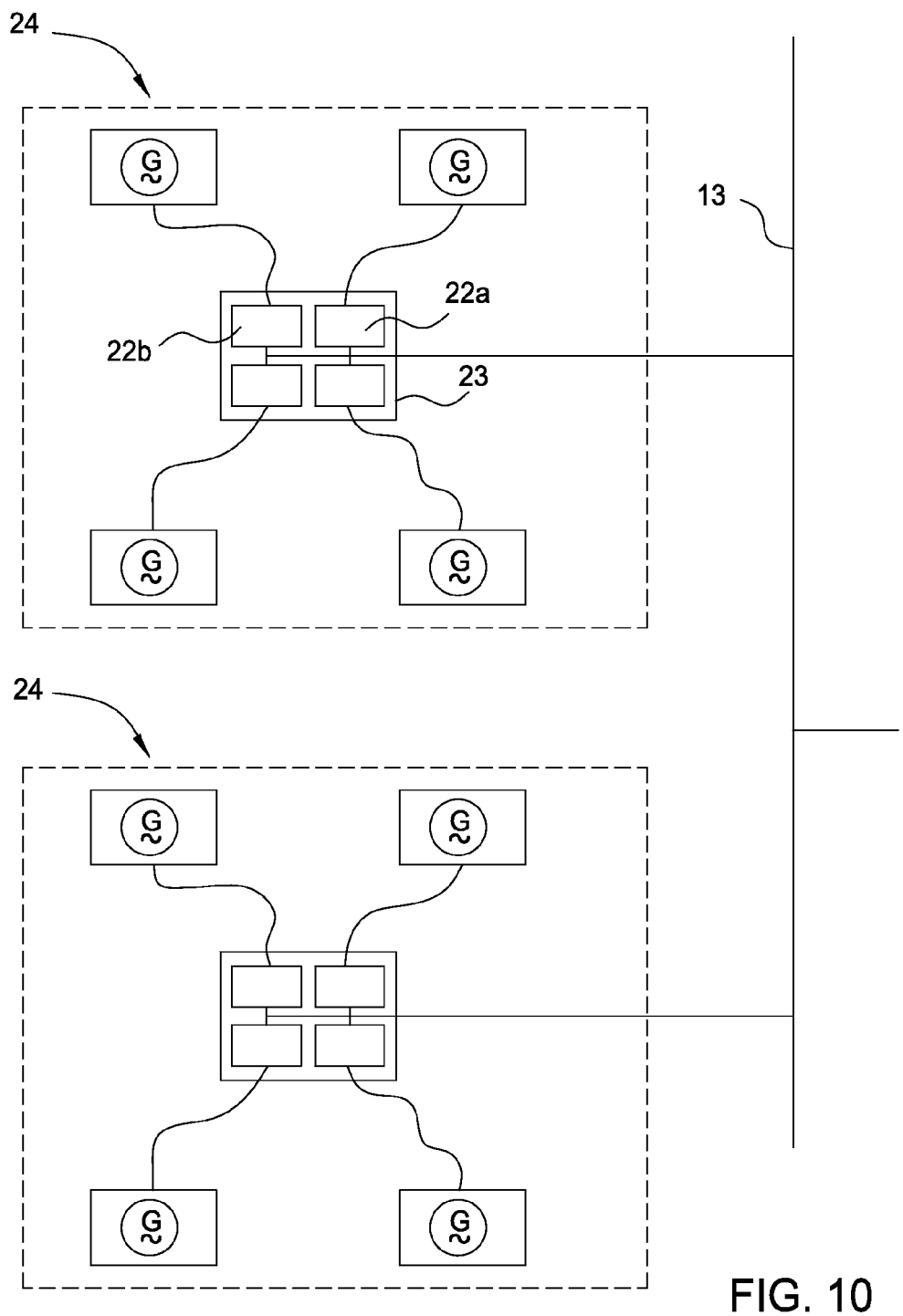
FIG. 10 illustrates a fourth preferred embodiment including a plurality of wind turbines with power modules in a common housing.

FIG. 10 illustrates fourth preferred embodiment including a plurality of wind turbines with power modules in a common housing.

Each wind turbine is constructed as described above with the power components: An AC generator 7, a nominal output value transformer 10, power electronic converter units 11, and a utility grid transformer 12. Every power component of the wind turbine beyond the generator is positioned in proximity of each other as a power module 22*a* and preferably together with similar power module 22*b* of other wind turbines in a common housing 23. The wind turbines and the common housing may be part of a wind park 24 transmitting AC power to the utility grid 13.

The invention has been exemplified above with reference to specific examples. However, it should be understood that the invention is not limited to the particular examples described above but may be used in connection with a wide variety of applications including applications comprising different combinations of the illustrated embodiments.

The invention claimed is:

1. A variable rotor speed wind turbine transmitting electric AC power to a utility grid, the wind turbine comprising:
   at least one AC generator;
   a power converter comprising at least three power electronic converter units each configured to perform AC-DC-AC conversion;
   at least one nominal output value transformer communicatively coupling the at least one AC generator and the power converter, and configured to transform at least one nominal output value of the at least one AC generator to at least one different nominal input value of the at least three power electronic converter units; and
   at least one utility grid transformer coupled to the power converter, wherein the nominal output value transformer, the utility grid transformer and the power converter transform phases of the at least one AC generator to at least three phases of the utility grid,
   wherein the nominal output value transformer, the utility grid transformer, and at least one of the power electronic converter units form a power module provided to the wind turbine, and wherein the power module is included in a common housing with one or more additional power modules corresponding to different wind turbines,
   wherein an organization and location of the power electronic converter units enables redundancy in the wind turbine by N-1 operation.

2. The variable rotor speed wind turbine according to claim 1 wherein the at least one AC generator is a polyphase synchronous or asynchronous AC generator.

3. The variable rotor speed wind turbine according to claim 2 wherein the at least one AC generator is a synchronous generator magnetised electrically or by permanent magnets.

4. The variable rotor speed wind turbine according to claim 2 wherein the at least one AC generator is a low-speed, high pole-number synchronous generator.

5. The variable rotor speed wind turbine according to claim 1 wherein each of the power electronic converter units have a same nominal rating or are of a same type.

6. The variable rotor speed wind turbine according to claim 1 wherein the nominal output value transformer comprises a fixed transformation ratio.

7. The variable rotor speed wind turbine according to claim 1 wherein the nominal output value transformer transforms a nominal generator voltage and/or number of phases.

8. The variable rotor speed wind turbine according to claim 7 wherein the nominal output value transformer transforms a nominal voltage output value of the at least one AC generator to a different nominal voltage input value of the power converter.

9. The variable rotor speed wind turbine according to claim 8 wherein the nominal output value transformer transforms a high voltage to a lower voltage below 3300 volts.

10. The variable rotor speed wind turbine according to claim 9 wherein the high voltage is chosen between the values of: 3300, 4160, 6600, 10000, 11000 and 13200 volts, and the lower voltage is chosen between values of 690, 1000, 2200 and 3300 volts per power electronic converter unit.

11. The variable rotor speed wind turbine according to claim 1, wherein the nominal output value transformer transforms a number of phases of current or voltage of the at least one AC generator to a different number of phases of current or voltage of the power converter.

12. The variable rotor speed wind turbine according to claim 1 wherein the nominal output value transformer, the utility grid transformer and the power converter transform three phases of the at least one AC generator to at least three phases of the utility grid.

13. The variable rotor speed wind turbine according to claim 1 wherein the at least one utility grid transformer transforms an output voltage rating and/or a number of phases of the power converter to the utility grid.

14. The variable rotor speed wind turbine according to claim 1 wherein the at least one utility grid transformer steps up a nominal output voltage of the power converter.

15. The variable rotor speed wind turbine according to claim 1 wherein the at least one of the at least three power electronic converter units is located in a tower of the wind turbine at a lower part of the tower such as at or in proximity of the tower foundation.

16. The variable rotor speed wind turbine according to claim 1 wherein each of the at least three power electronic converter units includes switchgear including a first switchgear in a connection before each of the at least three power electronic converter units and a second switchgear in a connection after each of the at least three power electronic converter units.

17. The variable rotor speed wind turbine according to claim 16 wherein the power module includes the at least three power electronic converter units and the switchgear.

18. The variable rotor speed wind turbine according to claim 1 wherein the number of power electronic converter units is between 3 and 10 parallel units.

19. The variable rotor speed wind turbine according to claim 1, wherein the variable rotor speed wind turbine is located in a wind park comprising a plurality of wind turbines.

20. The variable rotor speed wind turbine according to claim 1, wherein at least one of the power electronic converter units is located at a foundation of a tower of the wind turbine.

21. The variable rotor speed wind turbine according to claim 1, wherein the power module is provided within a separate enclosure to the wind turbine.

22. The variable rotor speed wind turbine according to claim 1, wherein each additional power module corresponds to a respective wind turbine.

23. The variable rotor speed wind turbine according to claim 1 wherein the at least three power electronic converter units of the power converter are included in the power module.

24. A method of transmitting electric power to an AC utility grid from a variable rotor speed wind turbine, the method comprising:
   generating AC power with at least one AC generator;
   transforming at least one nominal output value of the at least one AC generator to at least one different nominal input value of a power converter with at least one nominal output value transformer communicatively coupling the at least one AC generator and the power converter;
   converting the power to the AC utility grid with the power converter, the power converter comprising at least three power electronic converter units each configured to perform AC-DC-AC conversion; and
   transforming at least one value of the power converter to at least one different input value of the AC utility grid with at least one utility grid transformer coupled to the power converter, wherein the nominal output value transformer, the utility grid transformer, and the power converter transform phases of the at least one AC generator to at least three phases of the utility grid,
   wherein the nominal output value transformer, the utility grid transformer, and at least one of the power electronic converter units form a power module provided to the wind turbine, and wherein the power module is included in a common housing with one or more additional power modules corresponding to different wind turbines, and
   wherein an organization and location of the power electronic converter units enables redundancy in the wind turbine by N-1 operation.

25. The method of transmitting electric power to an AC utility grid according to claim 24, where the at least three power electronic converter units are connected or disconnected from the nominal output value transformer using switchgear coupled to the at least three power electronic converter units.

26. The method of transmitting electric power to an AC utility grid according to claim 25, wherein the switchgear disconnects one of the at least three power electronic converter units, wherein one or more of the at least three power electronic converter units that are not disconnected are controlled to a value close to a nominal power rating of the at least three power electronic converter units.

27. The method of claim 24 wherein the at least three power electronic converter units of the power converter are included in the power module.

28. A method of servicing or inspecting a variable rotor speed wind turbine transmitting electric AC power to a utility grid, the method comprising:
   transforming at least one nominal output value of at least one AC generator to at least one different nominal input value of a power converter, the power converter comprising at least three power electronic converter units each configured to perform AC-DC-AC conversion, with at least one nominal output value transformer communicatively coupling the at least one AC generator and the power converter;
   transforming at least one nominal value of the power converter with at least one utility grid transformer coupled to the power converter, wherein the nominal output value transformer, the utility grid transformer, and the power converter transform phases of the at least one AC generator to at least three phases of the utility grid;
   disconnecting one of the at least three power electronic converter units under servicing or inspection of the unit from the nominal output value and utility grid transformers using a switchgear; and
   operating, after disconnecting the one power electronic converter unit, the remaining power electronic converter units of the wind turbine in N-1 operation,
   wherein the nominal output value transformer, the utility grid transformer, and at least one of the power electronic converter units form a power module provided to the wind turbine, and wherein the power module is included in a common housing with one or more additional power modules corresponding to different wind turbines.

29. A variable rotor speed wind turbine for transmitting electric AC power to a utility grid, the wind turbine comprising:
   at least one AC generator;
   a power converter comprising at least three power electronic converter units each configured to perform AC-DC-AC conversion, wherein each of the power electronic converter units comprises a rectifier and an inverter;
   at least one nominal output value transformer communicatively coupling the at least one AC generator and the power converter, and configured to transform a high voltage output from the at least one AC generator to a lower voltage input to the power converter that is below 3300 volts; and
   at least one utility grid transformer coupled to the power converter and configured to transform a low voltage to a higher voltage above 3300 volts, wherein the at least one nominal output value transformer, the at least one utility grid transformer and the power converter transform phases of the at least one AC generator to at least three phases of the utility grid,
   wherein the nominal output value transformer, the utility grid transformer, and at least one of the power electronic converter units form a power module provided to the wind turbine, and wherein the power module is included in a common housing with one or more additional power modules corresponding to different wind turbines,
   wherein the power converter comprises a plurality of rectifiers and a plurality of inverters, wherein an organization and location of the plurality of rectifiers and the plurality of inverters enable redundancy in the wind turbine by N-1 operation.

30. The variable rotor speed wind turbine according to claim 29, wherein at least one of the power electronic converter units is located at a foundation of a tower of the wind turbine.

31. The variable rotor speed wind turbine according to claim 29 wherein the at least three power electronic converter units of the power converter are included in the common housing.

* * * * *